United States Patent
Stevens et al.

(10) Patent No.: US 8,205,514 B2
(45) Date of Patent: Jun. 26, 2012

(54) CONTROL MOMENT GYROSCOPE

(75) Inventors: Carlos J. Stevens, Peoria, AZ (US); Stephen E. Fiske, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 992 days.

(21) Appl. No.: 12/016,348

(22) Filed: Jan. 18, 2008

(65) Prior Publication Data

US 2010/0000349 A1    Jan. 7, 2010

(51) Int. Cl.
*G01C 19/30* (2006.01)

(52) U.S. Cl. ............... 74/5.47; 74/5.4; 74/5.7

(58) Field of Classification Search ........ 74/5.4, 74/5.46, 5.47, 5.7, 5.8, 5.9
See application file for complete search history.

(56) References Cited

U.S. PATENT DOCUMENTS

| | | | | |
|---|---|---|---|---|
| 2,422,267 A | * | 6/1947 | Summers, Jr. | 74/5.1 |
| 2,856,777 A | * | 10/1958 | Krupick | 74/5.4 |
| 2,887,885 A | * | 5/1959 | Lackey et al. | 74/5.5 |
| 2,934,961 A | | 5/1960 | Katz | |
| 3,527,108 A | * | 9/1970 | Fay | 74/5.34 |
| 3,555,692 A | * | 1/1971 | Aberle et al. | 33/326 |
| 3,979,090 A | | 9/1976 | Brickner et al. | |
| 4,397,185 A | * | 8/1983 | Craig et al. | 73/504.11 |
| 5,419,212 A | * | 5/1995 | Smith | 74/5.1 |
| 6,973,847 B2 | * | 12/2005 | Adams et al. | 74/5.47 |
| 7,097,140 B2 | * | 8/2006 | Staley et al. | 244/165 |
| 2004/0035229 A1 | | 2/2004 | Meffe | |

FOREIGN PATENT DOCUMENTS

WO    9414653 A1    7/1994
WO    9501279 A1    1/1995

OTHER PUBLICATIONS

EP Search Report, 09150569.3 dated May 19, 2009.

* cited by examiner

*Primary Examiner* — Ha D. Ho
(74) *Attorney, Agent, or Firm* — Ingrassia Fisher & Lorenz, P.C.

(57) ABSTRACT

A control moment gyroscope (CMG) is provided for deployment on a spacecraft. The CMG includes a stator housing, an inner gimbal assembly disposed in the stator housing, and a torque motor coupled to the stator housing and at least partially disposed around an intermediate portion of the inner gimbal assembly. The torque motor is configured to rotate the inner gimbal assembly about a gimbal axis.

17 Claims, 4 Drawing Sheets

CONTROL MOMENT GYROSCOPE

TECHNICAL FIELD

The present invention relates generally to rotating inertial devices and, more particularly, to a control moment gyroscope including an improved momentum control system configuration that eliminates the need for a discrete torque module assembly.

BACKGROUND

Control moment gyroscopes (CMGs) are commonly employed in satellite attitude control systems. A generalized CMG comprises an inner gimbal assembly (IGA) supported by a stator housing (e.g., basering structure). The IGA includes a rotor assembly comprised of an inertial element (e.g., a ring or cylinder) coupled to a shaft. A spin bearing is disposed at each end of the shaft to permit the rotor to rotate about a spin axis. A spin motor couples to and drives the rotor thus allowing momentum to be stored. A torque module assembly (TMA) is mounted to a first end portion of the stator housing, and a signal module assembly (SMA) is mounted to the second end portion of the stator housing opposite the TMA. The TMA functions to selectively rotate the IGA assembly about a gimbal axis orthogonal to the rotor spin axis, which results in the production of an output torque orthogonal to the rotor spin axis and proportional to the gimbal rate. The SMA functions to deliver electrical signals and power across the rotary interface to the electrical components of the IGA assembly (e.g., the spin motor and electronics). The TMA may further include one or more rotation sensors (e.g., a tachometer, a resolver, etc.) suitable for monitoring the rotational rate, commutation, and/or the angular position of the inner gimbal assembly. Finally, to permit the CMG to be mounted to a host spacecraft (e.g., a satellite), a spacecraft interface (e.g., an annular structure including a plurality of bolt apertures) is provided on the outer surface of the stator housing.

Weight and volume are amongst the primary concerns in CMG design. Conventional CMGs are generally able to achieve rotor speeds of 6,000 revolutions per minute (RPM) or more depending upon the particular characteristics of the rotor. Rotors capable of rotating at higher speeds (e.g., up to 40,000 RPM) have been developed. Such an increase in CMG rotor speed permits the size of the rotor, and thus the size and weight of the CMG and host spacecraft, to be decreased without a reduction in CMG output torque. However, high speed rotors do not enable the dimensions of the TMA or the SMA to be reduced. Thus, as the CMG decreases in size, rotor size becomes less important in determining CMG weight and volume while the dimensions of the TMA and SMA become more significant drivers. Consequently, the TMA and, to a lesser extent, the SMA may add undesirable weight and volume to CMGs employing high speed rotors as well as smaller CMGs with lower torque requirements.

To impart a desired torque to the host spacecraft, the TMA rotates the IGA, and thus the spinning rotor, about the gimbal axis. The spinning rotor contains stored momentum due to its inertia about the spin axis and rotational rate. The output torque, which is proportional to the gimbal rate applied by the TMA, acts about an axis that is orthogonal to the spin and gimbal axes. This torque is transmitted from the CMG rotor to the spacecraft through the IGA and the stator housing. This load path tends to be relatively flexible. As a result, conventional CMGs often provide a less than optimum rotor-to-spacecraft load path resulting in low bandwidth performance regarding the transmission of torque to the spacecraft. In addition, the heat conduction path from the rotor spin bearings to the spacecraft mounting interface may be relatively lengthy and inefficient.

Considering the above, it would be desirable to provide a CMG, especially a CMG employing a high speed rotor, that is readily scalable, that has a high stiffness rotor-to-spacecraft load path, and that has a relatively efficient thermal conduction path. Preferably, such a CMG would employ a momentum control system that eliminates the need for a discrete TMA sub-assembly and thereby reduces the overall weight, volume, and part count of the CMG. Other desirable features and characteristics of the present invention will become apparent from the subsequent detailed description of the invention and the appended claims, taken in conjunction with the accompanying drawings and this background of the invention.

BRIEF SUMMARY

A control moment gyroscope (CMG) is provided for deployment on a spacecraft. The CMG includes a stator housing, an inner gimbal assembly disposed in the stator housing, and a torque motor coupled to the stator housing and at least partially disposed around an intermediate portion of the inner gimbal assembly. The torque motor is configured to rotate the inner gimbal assembly about a gimbal axis.

BRIEF DESCRIPTION OF THE DRAWINGS

At least one example of the present invention will hereinafter be described in conjunction with the following figures, wherein like numerals denote like elements, and.

DETAILED DESCRIPTION OF AT LEAST ONE EXEMPLARY EMBODIMENT

The following Detailed Description is merely exemplary in nature and is not intended to limit the invention or the application and uses of the invention. Furthermore, there is no intention to be bound by any theory presented in the preceding Background or the following Detailed Description.

Figure 1:
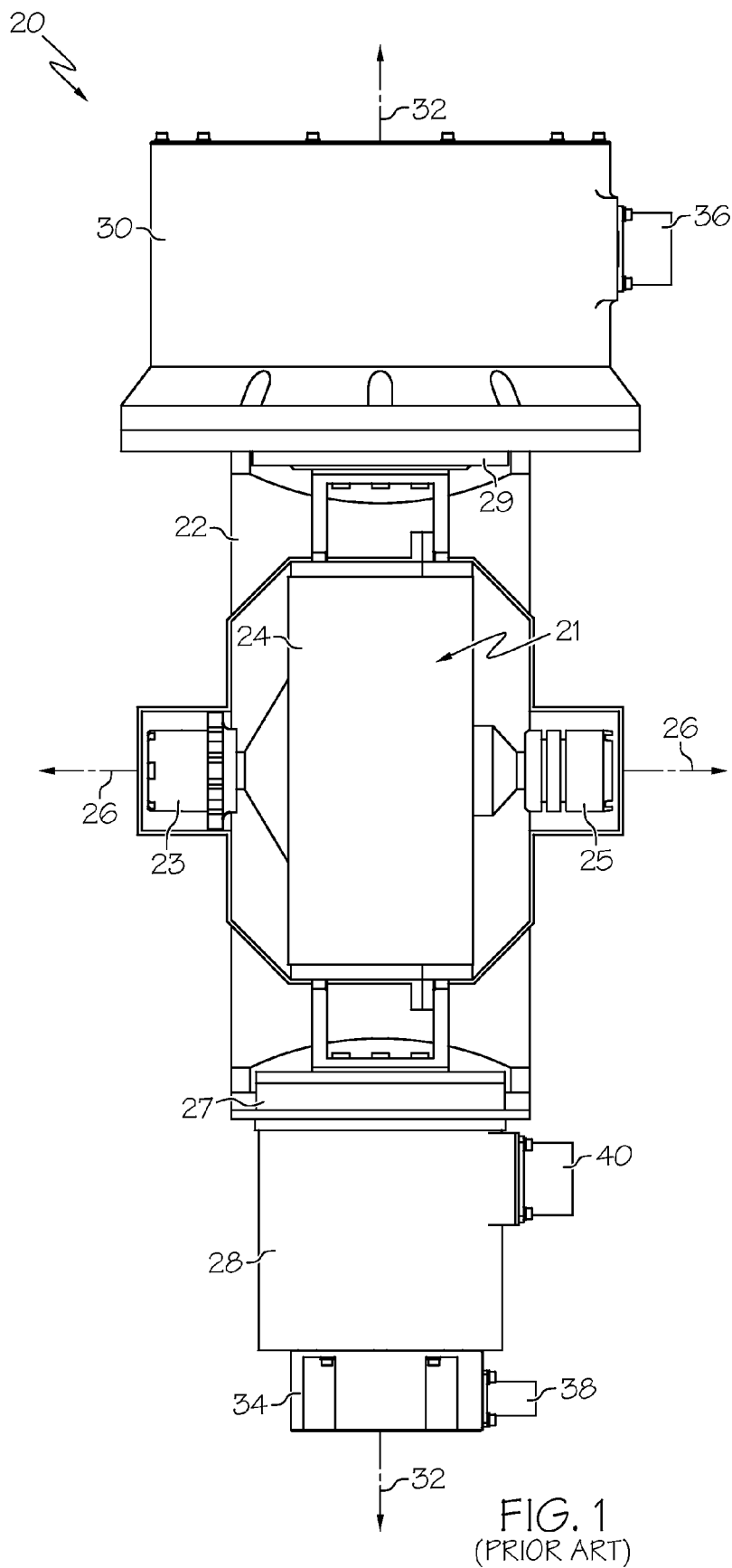
FIG. 1 is a plan view of a known high speed control moment gyroscope (CMG)

FIG. 1 is a plan view of a conventional control moment gyroscope (CMG) 20 suitable for deployment on a spacecraft, such as a satellite. CMG 20 is comprised of a stator housing 22 (e.g., a basering structure) that supports an inner gimbal assembly (IGA) 21. In this case, IGA 21 contains a high speed rotor 24 that is rotationally coupled to the housing of IGA 21 via first and second spin bearings 23 and 25. High speed rotor 24 may be rotated about a spin axis 26 by a spin motor (not shown) disposed within IGA 21. A signal module assembly (SMA) 28 and a torque module assembly (TMA) 30 are mounted to opposite end portions of stator housing 22 and IGA 21 such that IGA 21 is disposed between SMA 28 and TMA 30. TMA 30 includes a torque motor (not shown) that selectively rotates IGA 21 about a gimbal axis 32. To facilitate the rotation of IGA 21, gimbal bearings 27 and 29 are disposed between stator housing 22 and IGA 21. If desired, TMA 30 may be provided with a position sensor and/or a rate sensor (e.g., a resolver, a tachometer, etc.) suitable for motor commutation and/or for measuring the angular position or rotational rate of IGA 21. In addition, and as shown in FIG. 1, a gimbal axis potentiometer 34 may be mounted to an end of SMA 28 to measure the angular position of IGA 21. To permit TMA 30 and gimbal axis potentiometer 34 to be connected to an external power source, TMA and potentiometer power transfer connectors 36 and 38 are provided on the exterior of TMA 30 and potentiometer 34, respectively.

SMA 28 comprises a housing containing an axial slip ring assembly. An SMA power transfer connector 40 is disposed on the exterior of SMA 28. SMA 28 permits power received via connector 40, and other electrical signals, to be transferred across a rotary interface and to the electrical components of IGA 21 (e.g., spin motor, temperature transducers, etc.). A spacecraft mounting interface is provided on the exterior of CMG stator housing 22 and may comprise, for example, an annular structure having a plurality of bolt apertures formed therethrough. The spacecraft mounting interface may be bolted directly onto the wall of a spacecraft or bolted to a mounting structure that is, in turn, attached to the spacecraft. During operation of CMG 20, TMA 30 selectively rotates IGA 21 about gimbal axis 32 to impart a gyroscopic torque to the host spacecraft. When this occurs, torque is transmitted from the rotor to the spacecraft along a path referred to herein as a direct rotor-to-spacecraft load path. A large portion of the rotor-to-spacecraft load path is through stator housing 22. As noted above, the housing of IGA 21 may relatively thin-walled and flexible and, consequently, poor at transmitting torque and heat from the spin bearings.

Referring still to FIG. 1, high speed rotor 24 mounted within inner gimbal assembly (IGA) 21 permits the size and weight of IGA 21, and thus stator housing 22, to be minimized without a reduction in output torque or momentum. This decrease in the size and weight of IGA 21 does not, however, impact the size and weight of TMA 30 since the output torque of the TMA is established by the momentum and output torque performance of the CMG as a whole. Consequently, in a relative sense, TMA 30 may become more of a significant driver in CMG size and weight. Therefore, to mitigate the need for a discrete and end-mounted torque module assembly, an exemplary embodiment of a control moment gyroscope wherein the components of the TMA (e.g., the torque motor and, perhaps, one or more rotation sensors) are integrated into or on stator housing 22 and IGA 21 will now be described in conjunction with FIGS. 2 and 3.

Figure 2:
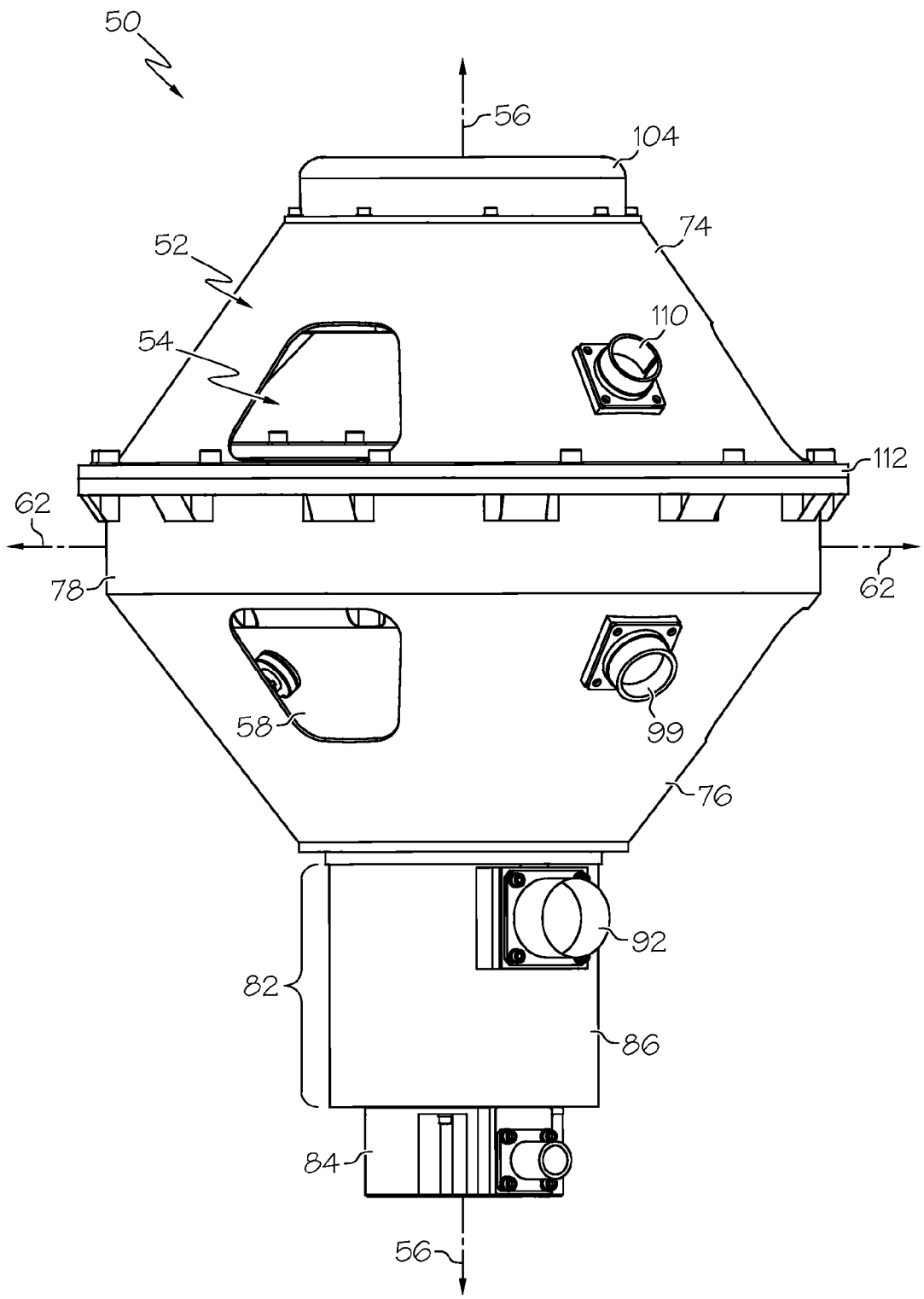
FIGS. 2 and 3 are isometric and cross-sectional views, respectively, of a CMG in accordance with a first exemplary embodiment.
Figure 3:
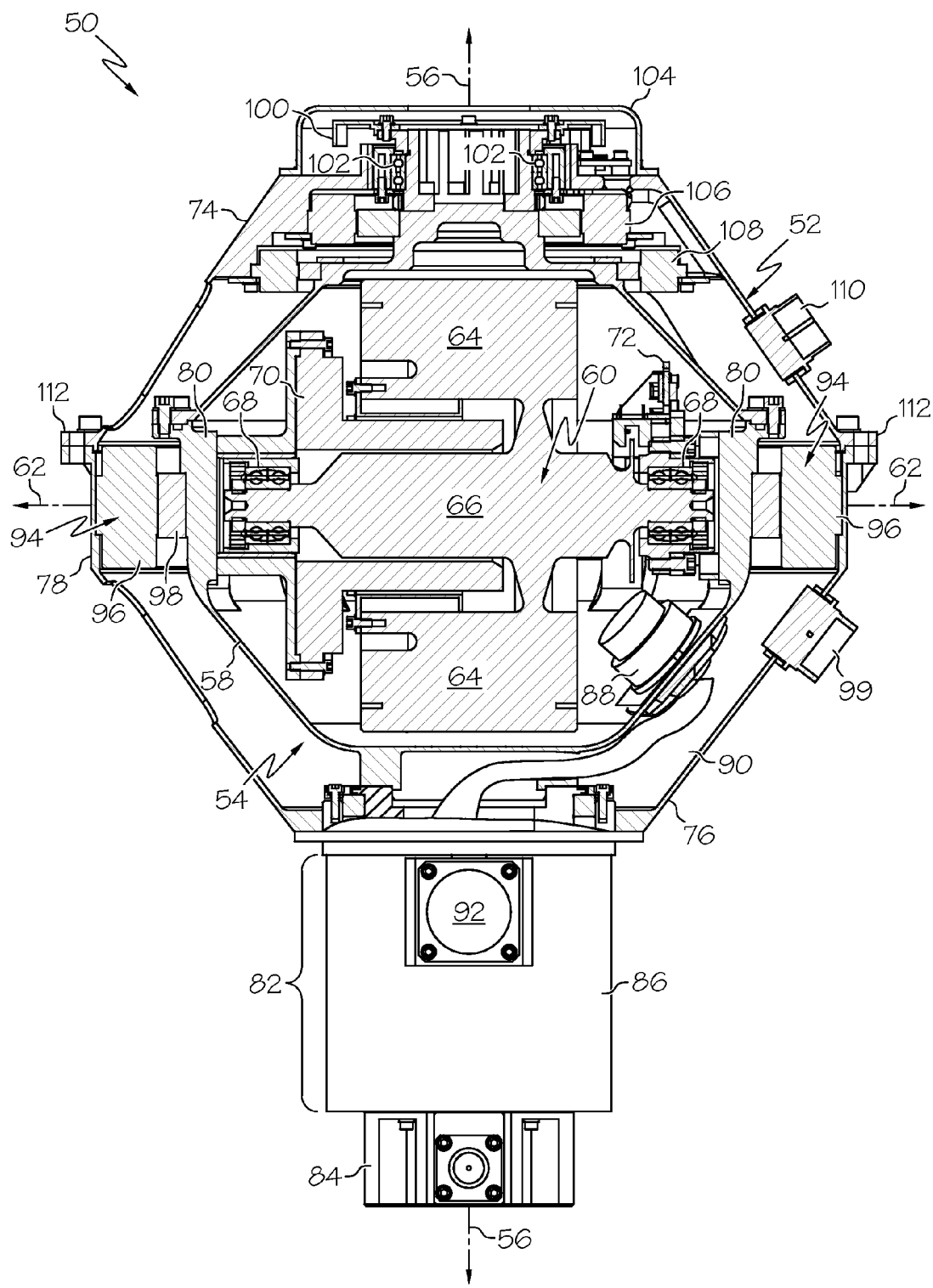

FIGS. 2 and 3 are isometric and cross-sectional views, respectively, of a CMG 50 in accordance with a first exemplary embodiment. CMG 50 comprises a stator housing 52 in which an inner gimbal assembly (IGA) 54 is mounted for rotation about a gimbal axis 56. IGA 54 comprises an IGA housing 58 containing a high speed rotor 60. As illustrated in FIG. 3, rotor 60 includes an inertial element 64 (e.g., a ring or cylinder) fixedly coupled to a rotatable shaft 66. To facilitate the rotational movement of rotor 60, a spin bearing 68 is disposed around each end of shaft 66. A spin motor 70 is likewise disposed around an intermediate portion of shaft 66 and attached to lower IGA housing 58. When energized, spin motor 70 imparts torque to shaft 66 to rotate rotor 60 about a spin axis 62. As shown in FIG. 3 at 72, a spin motor commutation shutter and circuit card assembly may also be mounted within IGA 54 and function to coordinate the power phases of spin motor 70 in the well-known manner.

For the purposes of the instant Application, it is useful to conceptually divide stator housing 52 into three portions, namely: a first end portion 74; a second end portion 76, which is substantially opposite first end portion 74; and an intermediate portion 78, which is disposed between first end portion 74 and second end portion 76. With reference to the orientation shown in FIGS. 2 and 3, first end portion 74, second end portion 76, and intermediate portion 78 correspond to the upper portion, the lower portion, and the middle portion of stator housing 52, respectively. Stator housing 52 has a generally spherical shape such that the average inner and outer diameters of intermediate portion 78 are significantly greater than the average inner and outer diameters of first and second end portions 74 and 76. IGA housing 58, and more generally IGA 54, may likewise be considered as having an intermediate portion 80. Intermediate portion 80 of IGA housing 58 generally aligns with intermediate portion 78 of stator housing 52; e.g., as indicated in FIG. 3, portions 78 and 80 may each be transected by spin axis 62. In a preferred embodiment, intermediate portion 78 of stator housing 52 generally circumscribes, and perhaps is substantially co-axial with, intermediate portion 80 of IGA 54.

As was the case previously, a signal module assembly (SMA) 82 is mounted to end portion 76 of stator housing 52 and supports an end portion of IGA 54 via gimbal bearings (not shown) housed within SMA 82. If desired, a gimbal axis potentiometer 84 may be mounted to an end portion of SMA 82 substantially opposite stator housing 52. SMA 82 comprises an SMA housing 86 in which an axial slip ring assembly is disposed (not shown). Slip ring assembly includes a rotor portion (e.g., a shaft) disposed within a stator portion (e.g., a tubular sleeve). The rotor portion of the slip ring assembly is electrically coupled to a component of IGA 54 (e.g., an SMA power connector 88 associated with torque motor 70) via an elongated connector 90 (e.g., a sheathed cable bundle). The stator portion of the slip ring assembly is fixedly coupled to SMA housing 86 and electrically coupled to an SMA power transfer connector 92 provided on the exterior of SMA housing 86. When IGA 54 rotates about gimbal axis 56, elongated connector 90 and the slip ring rotor rotate along therewith. As the slip ring rotor rotates, a plurality of flexible conductive fingers (not shown) maintains electrical contact between the slip ring rotor and the slip ring stator. In this manner, SMA 82 and elongated connector 90 permit electrical signals and/or power to be delivered across a rotary interface and to the electrical components of IGA 54 (e.g., spin motor 70 and commutation electronics 72).

In contrast to CMG 20 described above in FIG. 1, CMG 50 does not include a discrete torque module assembly mounted to an end portion of stator housing 52. Instead, CMG 50 employs a torque motor 94 that is mounted within a central portion of stator housing 52. Although the precise positioning of torque motor 94 will inevitably vary amongst embodiments, torque motor 94 is preferably mounted to an inner surface of intermediate portion 78 of stator housing 52 and at least partially disposed around intermediate portion 80 of IGA 54. In the illustrated exemplary embodiment, torque motor 94 is transected by spin axis 62. Torque motor 94 may comprise any device suitable for imparting torque to IGA housing 58 to thereby rotate IGA 54 about gimbal axis 56, including various direct drive, gear train, and friction drive mechanisms. This notwithstanding, torque motor 94 preferably comprises an electromagnetic device that substantially surrounds (e.g., encircles) IGA 54. For example, torque motor 94 may comprise a series of magnets circumferentially spaced or dispersed about the exterior of IGA housing 58 and/or gimbal axis 56. In the specific implementation shown in FIG. 3, torque motor 94 comprises: (i) a plurality of windings 96 mounted to an inner surface of intermediate portion 78 (or a central portion) of stator housing 52, and (ii) a plurality of magnets 98 mounted to an outer surface of intermediate portion 80 (or a central portion) of rotor IGA housing

58. Magnets 98 reside substantially adjacent windings 96. When windings 96 are energized, the magnetic flux of windings 96 is imparted on magnets 98 thus producing a torque that causes IGA 54 and, therefore, magnets 98 to rotate about gimbal axis 56 in a controlled manner. Power may be supplied to torque motor 94 by way of a power connector 99 disposed on the exterior of stator housing 52.

Figure 4:
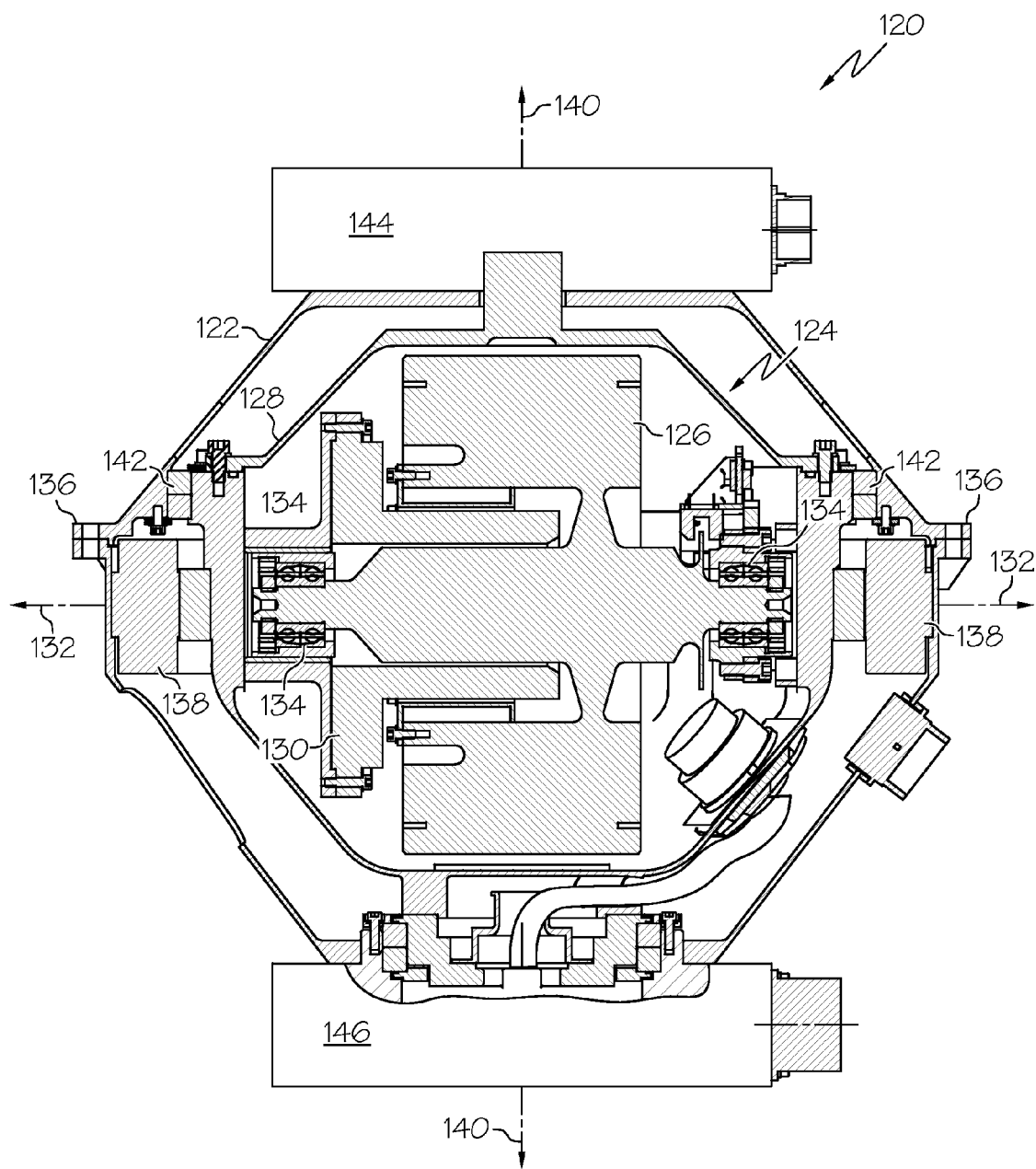
FIG. 4 is a cross-sectional view of a CMG in accordance with a second exemplary embodiment.

In the exemplary embodiment shown in FIG. 3, a gimbal commutation shutter and circuit card assembly 100 is mounted within end portion 74 of stator housing 52 to coordinate the power phases of torque motor 94; however, in alternative embodiments, the torque motor commutation shutter and the circuit card assembly (as well as the tachometer and resolver described below) may be replaced (or augmented) utilizing an optical rotation sensor as described below in conjunction with FIG. 4. If desired, a gimbal bearing 102 (e.g., a floating duplex bearing cartridge) may also be disposed within end portion 74 of stator housing 52 between an inner structure of stator housing 52 and IGA housing 58. Gimbal bearing 102 supports IGA 54 and facilitates the rotational movement thereof. In addition to, or in lieu of gimbal bearing 102, torque motor 94 may be configured to magnetically suspend IGA housing 58 and thereby further support and facilitate the rotation of IGA 54. Finally, to provide access to gimbal bearing 102, gimbal commutation shutter and circuit card assembly 100, and other internal components of CMG 50, an end cover may be removably coupled to end portion 74 of stator housing 52 as generally shown in FIGS. 2 and 3 at 104.

Although by no means necessary, CMG 50 preferably includes at least one rotation sensor mounted between stator housing 52 and IGA 54 suitable for detecting a rotational characteristic of IGA 54. In the illustrated exemplary embodiment, CMG 50 comprises two such sensors: (i) a tachometer 106 configured to monitor the rotational rate of IGA 54, and (ii) a resolver 108 configured to monitor the angular position of IGA 54. In the illustrated exemplary embodiment, tachometer 106 and resolver 108 are mounted within first end portion 74 of stator housing 52 substantially opposite SMA 82. Power may be supplied to tachometer 106 and resolver 108 via a power connector 110 disposed on the exterior of stator housing 52. Of course, tachometer 106 and resolver 108 are but two examples of the various types of sensors that may be employed by CMG 50. As a further example, an optical rotation sensor (e.g., an optical encoder) may be employed to monitor the rotational rate and/or the angular position of the inner gimbal assembly as described below in more detail in conjunction with FIG. 4.

A spacecraft mounting interface 112 is provided on the exterior of stator housing 52. In illustrated example, spacecraft mounting interface 112 comprises a substantially annular structure disposed around intermediate portion 78 of stator housing 52. A plurality of bolt apertures is formed through spacecraft mounting interface 112 to permit CMG 50 to be bolted to the wall of a host spacecraft or to an intermediary mounting structure that is, in turn, affixed to the host spacecraft. When mounted in this manner, CMG 50 may impart torque to the host spacecraft to control the attitude thereof. As most clearly shown in FIG. 3, torque motor 94 and spacecraft mounting interface 112 are preferably disposed substantially adjacent one another. Due to the proximity of torque motor 94 to spacecraft mounting interface 112 and intermediate portion 80 of IGA housing 58, and to the general design of torque motor 94, CMG 50 provides a relatively stiff path for transmitting torque to IGA 54. This, in turn, decreases CMG torque ripple and improves momentum control system dynamics (e.g., bandwidth).

It should thus be appreciated from the foregoing description that an exemplary CMG has been provided that employs a center-mounted torque motor and, in a preferred embodiment, one or more rotation sensors disposed between the stator housing and the IGA housing. Notably, the exemplary CMG eliminates the need for a discrete, end-mounted TMA and thereby significantly reduces the overall weight, volume, and part count of the CMG. This savings in weight and size may be more fully appreciated by comparing CMG 50 shown in FIG. 2 to CMG 20 shown in FIG. 1 (although it will be noted that FIGS. 1-3 are not drawn to a precise scale). As a further advantage, the design of CMG 50 is readily scalable.

Of course, the above-described CMG (i.e., CMG 50 shown in FIGS. 2 and 3) is but one example of a particular embodiment of the inventive CMG; various other embodiments may be implemented without departing from the scope of the invention as set-forth in the appended claims. To further emphasize this point, FIG. 4 provides a cross-sectional view of a CMG 120 in accordance with a second exemplary embodiment. CMG 120 is similar to CMG 50 described above in conjunction with FIGS. 2 and 3; e.g., CMG 120 comprises a stator housing 122 that supports an inner gimbal assembly (IGA) 124. IGA 124 includes, amongst other structural components, a rotor 126 mounted within an IGA housing 128. A spin motor 130 is also disposed within IGA housing 128 and, when energized, imparts torque to rotor 126 to rotate rotor 126 about a spin axis 132. To facilitate the rotation of rotor 126, a spin bearing 134 is disposed around each end of the shaft of rotor 126. As was the case previously, a spacecraft mounting interface 136 is provided on the exterior of stator housing 122, and a torque motor 138 is disposed within stator housing 122 and disposed at least partially around an intermediate portion of IGA 124. As indicated above, torque motor 138 functions to selectively rotate IGA 124 about a gimbal axis 140 so as to impart gyroscopic torque to a host spacecraft mounted to mounting interface 136. A gimbal bearing 142 (e.g., a thin section duplex bearing) is disposed between IGA housing 128 and stator housing 122 to facilitate the rotational movement of IGA 124 about gimbal axis 140.

CMG 120 differs from CMG 50 (FIGS. 2 and 3) in three primary manners. First, gimbal bearing 142 is disposed between an intermediate or central portion of IGA 124 and stator assembly 122. Due to its proximity to spin axis 132 and to spin bearings 134, gimbal bearing 142 provides an improved heat conduction path and a relatively efficient (stiff) torque conduction path from rotor 126 to spacecraft mounting interface 136. As a second disparity between CMG 120 and CMG 50, CMG 120 does not include a tachometer, a resolver, or a gimbal commutation shutter and circuit card assembly. Instead, these components have been replaced by an optical rotation sensor 144 (e.g., an absolute optical encoder) capable of detecting the angular position and/or rotational rate of IGA 124. As shown in FIG. 4, optical rotation sensor 144 may be fixedly coupled to an end portion of stator housing 122. Alternatively, optical rotation sensor 144 may be mounted within a central portion of stator housing 122 (e.g., adjacent gimbal bearing 142). Finally, as a third primary different between CMG 120 and CMG 50, CMG 120 includes a pancake slip ring assembly 146 mounted to an end portion of stator housing 122 substantially opposite optical rotation sensor 144. The modest length of pancake slip ring assembly 146 (relative to an axial slip ring assembly, such as that employed by CMG 50 and shown in FIGS. 2 and 3) further decreases the overall dimensions of CMG 120. Pancake slip ring assembly 146 comprises a rotary transformer suitable for supplying power across a rotary interface and to IGA 124 as described above. Pancake slip ring assembly 146 may also be configured to provide control signals to IGA 124, although it will be appreciated that a fiber optic device (e.g., optical rotation sensor 144) may instead be utilized to perform this function.

It should thus be appreciated that there has been provided multiple examples of a CMG employing a high speed rotor that eliminates the need for a discrete TMA sub-assembly and thereby reduces the overall weight, volume, and part count of the CMG. Furthermore, in at least one embodiment, the CMG provides a high stiffness rotor-to-spacecraft load path and has a relatively efficient thermal conduction path. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A control moment gyroscope (CMG) for deployment on a spacecraft, the CMG comprising:
    a stator housing;
    an inner gimbal assembly disposed in the stator housing, the inner gimbal assembly comprising:
        an inner gimbal assembly housing rotatably coupled to the stator housing;
        a rotor rotatably coupled to the inner gimbal assembly housing; and
        a spin motor coupled to the inner gimbal assembly housing and configured to rotate the rotor about a spin axis; and
    a torque motor coupled to the stator housing and surrounding an intermediate portion of the inner gimbal assembly, the torque motor configured to rotate the inner gimbal assembly about a gimbal axis.

2. A CMG according to claim 1 wherein the torque motor is circumferentially spaced about the intermediate portion of the inner gimbal assembly.

3. A CMG according to claim 2 wherein the torque motor comprises a substantially annular device that is generally co-axial with the gimbal axis.

4. A CMG according to claim 1 further comprising a spacecraft mounting interface disposed on the stator housing, the torque motor residing substantially adjacent the spacecraft mounting interface.

5. A CMG according to claim 1 wherein the torque motor is coupled between an outer surface of the inner gimbal assembly housing and an inner surface of the stator housing.

6. A CMG according to claim 1 wherein the torque motor comprises:
    a plurality of windings fixedly coupled to a central portion of the stator housing; and
    a plurality of magnets fixedly coupled to a central portion of the inner gimbal housing and residing substantially adjacent the plurality of windings.

7. A CMG according to claim 1 further comprising a gimbal bearing disposed in the stator housing and supporting the inner gimbal assembly, the gimbal bearing disposed proximate the intermediate portion of the inner gimbal assembly.

8. A CMG according to claim 1 further comprising a gimbal bearing disposed in the stator housing and supporting the inner gimbal assembly, the gimbal bearing disposed proximate an end portion of the inner gimbal assembly.

9. A CMG according to claim 1 wherein the torque motor comprises an electromagnetic device configured to magnetically suspend the inner gimbal assembly.

10. A CMG according to claim 1 further comprising a rate sensor disposed between the stator housing and the inner gimbal assembly, the rate sensor configured to monitor the rotational rate of the inner gimbal assembly.

11. A CMG according to claim 1 further comprising a position sensor disposed between the stator housing and the inner gimbal assembly, the position sensor configured to monitor the angular position of the inner gimbal assembly.

12. A control moment gyroscope (CMG) for deployment on a spacecraft, the CMG comprising:
    a stator housing;
    an inner gimbal assembly, comprising:
        an inner gimbal assembly housing rotatably mounted in the stator housing;
        a rotor rotatably coupled to the inner gimbal assembly housing; and
        a spin motor coupled to the inner gimbal assembly housing and configured to rotate the rotor about a spin axis; and
    a torque motor residing between the stator housing and the inner gimbal assembly housing, the torque motor circumferentially disposed around a central portion of the inner gimbal assembly housing and configured to rotate the inner gimbal assembly about a gimbal axis; and
    a rotation sensor coupled to a surface of the stator housing and to an external surface of the inner gimbal assembly housing, the rotation sensor configured to monitor at least one rotational characteristic of the inner gimbal assembly.

13. A CMG according to claim 12 further comprising a signal module assembly (SMA), the SMA comprising:
    an SMA housing mounted to a first end portion of the stator housing; and
    a pancake slip ring assembly mounted within the SMA housing and electrically coupled to the inner gimbal assembly.

14. A CMG according to claim 12 wherein the rotation sensor is selected from the group consisting of a tachometer, a resolver, and an optical rotation sensor.

15. A CMG according to claim 12 wherein the rotation sensor comprises an optical encoder mounted in the stator housing.

16. A CMG according to claim 12 wherein the torque motor is mounted between an intermediate portion of the stator housing and an intermediate portion of the inner gimbal assembly housing.

17. A control moment gyroscope (CMG) for deployment on a spacecraft, the CMG comprising:
    a stator housing, comprising:
        a first end portion;
        a second end portion substantially opposite the first end portion; and
        an intermediate portion between the first end portion and the second end portion;
    an inner gimbal assembly disposed in the stator housing;
    a torque motor coupled to the intermediate portion of the stator housing, the torque motor disposed at least partially around the inner gimbal assembly;
    a signal module assembly coupled to the second end portion of the stator housing; and
    a rotation sensor mounted within the first end portion of the stator housing proximate the inner gimbal assembly, the rotation sensor configured to monitor a rotational characteristic of the inner gimbal assembly.

* * * * *